United States Patent [19]

McNeely et al.

[11] Patent Number: 4,705,065

[45] Date of Patent: Nov. 10, 1987

[54] SAFETY RELIEF SYSTEM FOR CONTROL OR VENT VALVES

[75] Inventors: Michael D. McNeely, Katy; Walter W. Powell, Sugar Land, both of Tex.

[73] Assignee: Anderson, Greenwood & Company, Houston, Tex.

[21] Appl. No.: 864,083

[22] Filed: May 16, 1986

[51] Int. Cl.[4] .................................... F16K 17/10
[52] U.S. Cl. .................................... 137/484.6; 92/48; 92/62; 92/65; 137/488; 137/493; 251/31; 251/63.4
[58] Field of Search .............. 137/493, 488, 484.2, 137/484.6, 484.8, 492, 492.5; 251/31, 24, 77, 63.4; 92/48, 62, 64, 65

[56] References Cited

U.S. PATENT DOCUMENTS

| | | | |
|---|---|---|---|
| 1,678,700 | 7/1928 | McEwan | 137/488 |
| 2,214,963 | 9/1940 | Jurs | 137/492 |
| 2,532,123 | 11/1950 | Shafer | 251/24 |
| 2,599,979 | 6/1952 | Drane | 137/493 |
| 3,077,186 | 2/1963 | De Beaubien et al. | 92/62 X |
| 3,187,640 | 6/1965 | Young et al. | 92/65 X |
| 3,424,062 | 1/1969 | Gummer et al. | 92/64 X |
| 4,390,041 | 6/1983 | Reip | 137/488 |
| 4,587,884 | 5/1986 | Tsubouchi | 92/48 X |
| 4,609,008 | 9/1986 | Anderson et al. | 137/488 |

OTHER PUBLICATIONS

Eddy et al., published U.S. patent application 557,868, Mar. 21, 1950.

Primary Examiner—Martin P. Schwadron
Assistant Examiner—Stephen M. Hepperle
Attorney, Agent, or Firm—Vinson & Elkins

[57] ABSTRACT

A safety relief system for a valve in a vent or a main flowline. The safety relief system utilizes a main actuator (24) utilized primarily for a positive pressure condition and a vacuum actuator (96) in axial alignment with the main actuator (24) utilized exclusively for a negative pressure condition. The main valve member (18) has a stem (22) which extends within both actuators (24, 96) and diaphragms (26, 100) are connected to the stem (22) for movement of the valve member (18).

26 Claims, 8 Drawing Figures

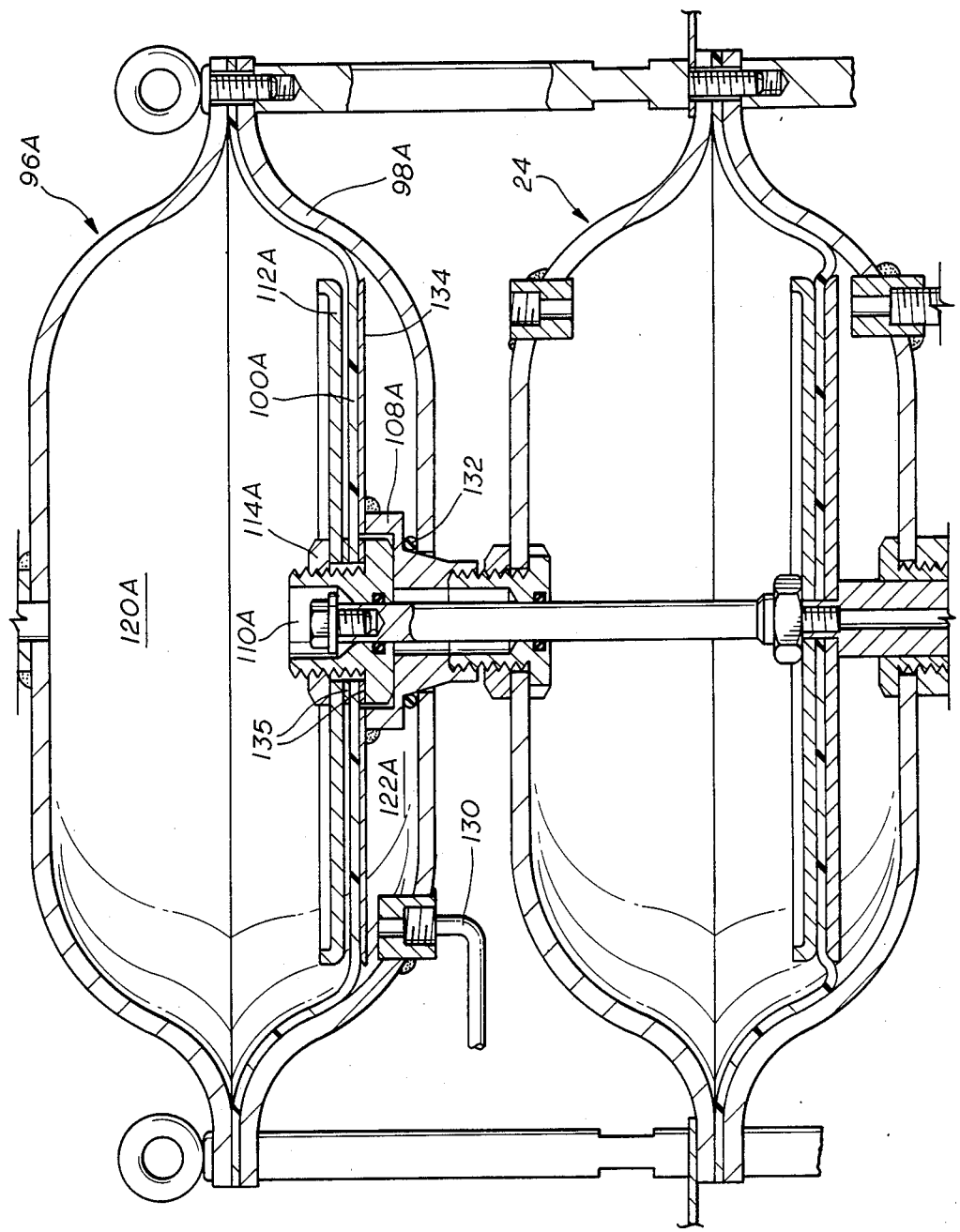

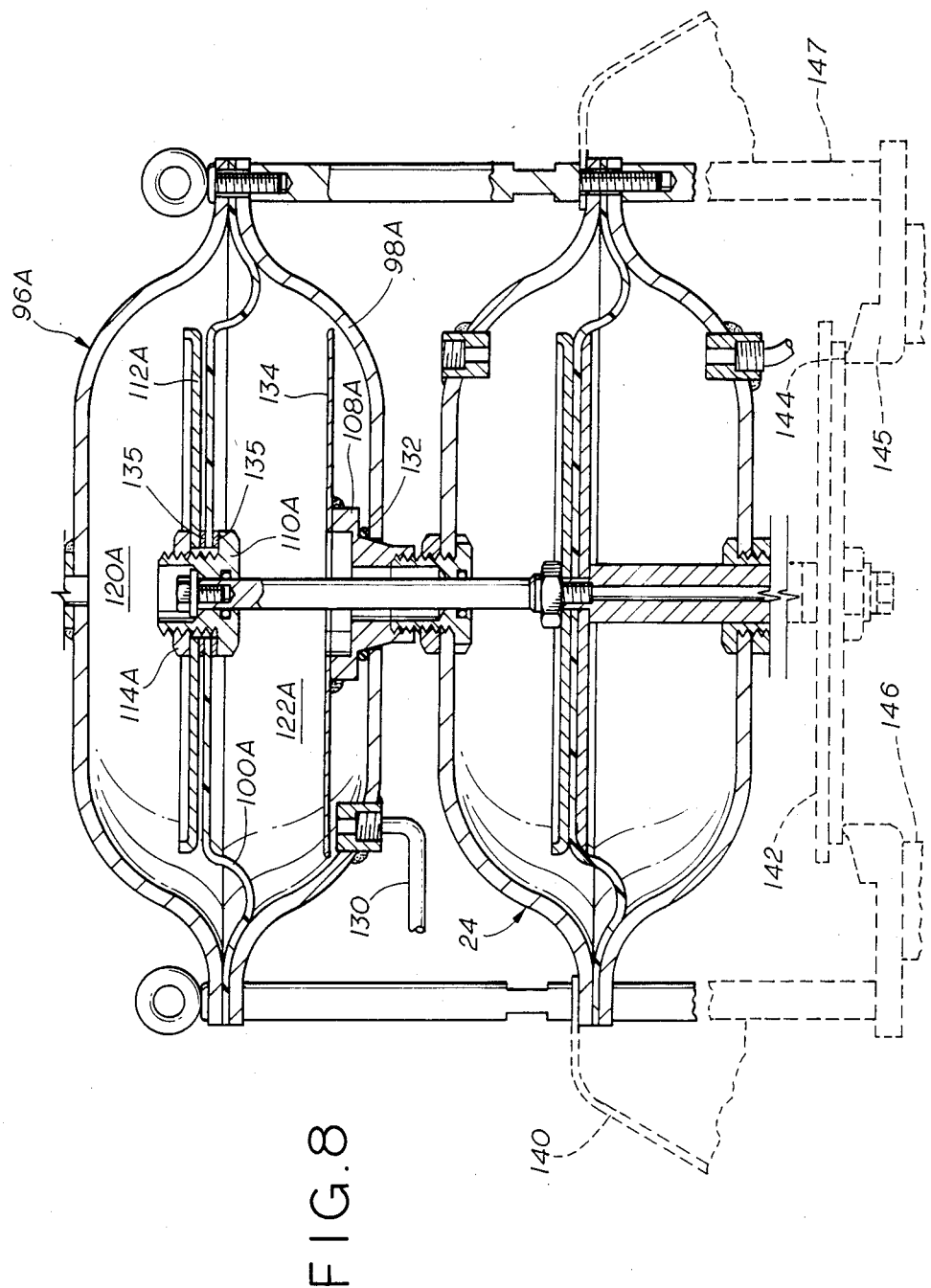

SAFETY RELIEF SYSTEM FOR CONTROL OR VENT VALVES

BACKGROUND OF THE INVENTION

This invention relates to a safety relief system for a valve in a vent or a main flowline, and more particularly to a safety relief system utilizing a vacuum boost actuator connected to the valve for opening of the valve under a negative pressure.

Heretofore, safety relief systems have utilized a control valve in the main flowline having a main diaphragm actuator with the dome or upper fluid chamber of the actuator in fluid communication with an associated pilot valve which senses upstream fluid pressures in the flowline thereby to control the movement of the main valve member across the flowline.

The main actuator heretofore while responsive to a negative pressure to open the main valve member does not respond to a minimal negative pressure in view of the relatively small effective fluid pressure differential area exposed to the negative fluid pressure. When desired heretofore to open under a minimal negative fluid pressure condition, a separate so-called vacuum breaker or vacuum device has been provided for the main flowline having a separate body and valve member for relief of the vacuum condition in the flowline. Such a separate vacuum device is expensive and has additional space requirements which is not suitable for certin installations. In the event a separate vacuum relief device is not provided, a much higher vacuum is required for the main actuator to open the valve member than is recommended by pertinent associated code requirements or specifications such as ASME codes or the like, for example.

A main diaphragm actuator may be designed for a set pressure of around 50 psi or higher, for example, and must have the capability of lifting the main valve member and associated attached moving parts. Likewise, upon the exertion of a negative pressure, the same main valve member and associated moving parts must be lifted and, therefore, a high vacuum is required for opening of the main valve member. Thus, when a relatively small differential pressure area is provided, a relatively high vacuum is required to open the main valve member.

Regulator valves or the like have utilized two or more diaphragm actuators heretofore. For example, U.S. Pat. No. 1,956,977 dated May 1, 1934 shows a regulating valve in which a pair of diaphragms are connected to a valve stem for controlling movement of a main valve member but the diaphragms have a common fluid chamber and both diaphragms move with the main valve member under positive pressure.

U.S. Pat. No. 863,528 dated Aug. 13, 1907 shows a fluid pressure regulator in which three diaphragms are utilized to permit a travel of the main valve member twice the travel of the diaphragms thereby to cause the regulator to respond quickly to fluid or gas changes in the main flowline.

U.S. Pat. No. 3,256,903 dated June 21, 1966 shows a vacuum regulator in which separate vacuum actuators are connected to a valve stem and are responsive to a negative pressure for movement of a main valve member. Both actuators are vacuum actuators, however, and are not designed for normal movement of a main valve member under positive pressure.

SUMMARY OF THE INVENTION

The present invention is directed to a safety relief system for a vent or control valve having a separate vacuum actuator for the associated main valve member arranged outwardly of and in longitudinally spaced axially aligned relation to the a actuator for the main valve member. The separate vacuum actuator is operatively connected to the main valve member and opens the main valve member in response to a negative pressure in the flowline sensed by a separate pilot valve, or directly by the separate vacuum actuator.

The separate vacuum actuator is inoperable during the normal operation of the main actuator under positive pressure conditions, and therefore exerts minimal drag on the movement of the main valve member under positive pressure conditions. Thus, the main actuator remains operable under a positive pressure condition in the main flowline. Further, since a separate vacuum actuator is provided, a minimal effective fluid pressure area differential between the main valve member and the pressure responsive member in the main actuator can be provided in order to obtain the most effective action under a positive pressure condition, and the main actuator can be designed specifically or exclusively for a positive pressure condition in the main flowline, if desired. In the event of failure of the main actuator, the separate vacuum actuator would function under a negative pressure condition in the main flowline for opening of the main valve member.

The main flowline may be connected at its inlet side to a tank and upon a negative pressure being reached in the tank, it is desirable to have the main control valve open to permit a backflow of fluid into the tank to relieve the negative pressure condition. A control valve normally has a main valve member across the main flowline with a stem extending therefrom within the main actuator and connected to a fluid pressure responsive member, such as a diaphragm, in the dome or pressure chamber of the main actuator. The safety relief system includes a pilot valve in fluid communication with the dome for sensing upstream pressure in the main flowline to control the movement of the diaphragm and associated main valve member. Thus, under a negative pressure or vacuum condition in the tank, it is desirable to have a maximum lifting action on the valve stem and associated valve member for moving the valve member to the open position.

The vacuum actuator of the present invention includes a diaphragm and a dome or fluid chamber over the diaphragm in fluid communication with the upstream or inlet side of the control valve either through the pilot valve or directly to the upstream side or inlet of the control valve. The valve stem forms a direct connection between the main valve member and the diaphragm and upon a vacuum or negative condition being reached in the fluid chamber of the vacuum actuator, the entire surface area of the diaphragm therein exerts a lifting action on the associated valve stem for moving the valve member to an open position. It is noted that the valve stem is mounted for longitudinal movement relative to the diaphragm of the vacuum actuator under a positive pressure condition, and therefore the diaphragm exerts a minimal drag acting against the lifting action of the valve member during a positive pressure condition in which the valve member is lifted by the main or primary actuator.

Another feature of this invention includes the use of an eductor tube or pitot tube connected to the lower fluid chamber of the main actuator and providing a fluid passage between the downstream or outlet side of the control valve and the lower fluid chamber of the main actuator acting on the lower or inner surface of the diaphragm. Upon a backflow of fluid to the pressure vessel or tank upon a negative pressure being reached in the tank and upstream side of the valve, a maximum total pressure is provided through the pitot tube to the lower side of the main diaphragm and this maximizes the lifting force of the diaphragm which results in maximum lift at minimal negative pressures. It is noted that upon normal fluid flow from the tank the pitot tube is directed downstream which assures that the fluid pressure in the lower chamber of the main actuator is always less than the fluid pressure in the upper chamber of the main actuator when the pilot valve is in fluid communication with the downstream side of the control valve. This assures that no diaphragm reversal occurs in the main actuator during normal positive pressure operation.

It is an object of the present invention to provide a safety relief system for a control valve in a main flowline utilizing a separate vacuum actuator operatively connected to the control valve for opening of the control valve under negative pressure.

It is a further object of this invention to provide such a vacuum actuator which is operable only under negative pressure in the flowline and does not act as a significant drag on the movement of the control valve during positive pressure conditions.

Another object of this invention is to provide such a separate vacuum actuator positioned in longitudinally spaced axial alignment with a main or primary actuator for a main control valve, the vacuum actuator having a diaphragm therein connected to the upper end of a main valve stem for movement with the main valve stem under a vacuum condition while permitting relative movement of the main valve stem under a positive pressure condition.

A further object of this invention is to provide a pitot tube for a main diaphragm actuator of the control valve in a safety relief system which permits fluid communication between the downstream side of the control valve and the lower fluid chamber of the diaphragm actuator thereby to eliminate a reversal of the diaphragm in the main actuator upon normal positive pressure operation, and to provide a maximum total lifting force of the diaphragm upon a reversal of fluid flow in the main flowline from a negative fluid pressure.

An additional object is to provide actuator means for opening a vent valve for a pressure vessel under either of predetermined negative fluid pressure or a predetermined positive fluid pressure within the pressure vessel.

Other objects, features, and advantages of this invention will become more apparent after referring to the following specification and drawings.

DESCRIPTION OF THE INVENTION

FIG. 7 is an enlarged sectional view of a modified vacuum actuator positioned over the main actuator and particularly adapted for testing of the vacuum actuator under a simulated vacuum condition; and FIG. 8 is a sectional view of the modified vacuum actuator shown in FIG. 7 but showing the position of the diaphragm under a simulated negative pressure.

Figure 1:
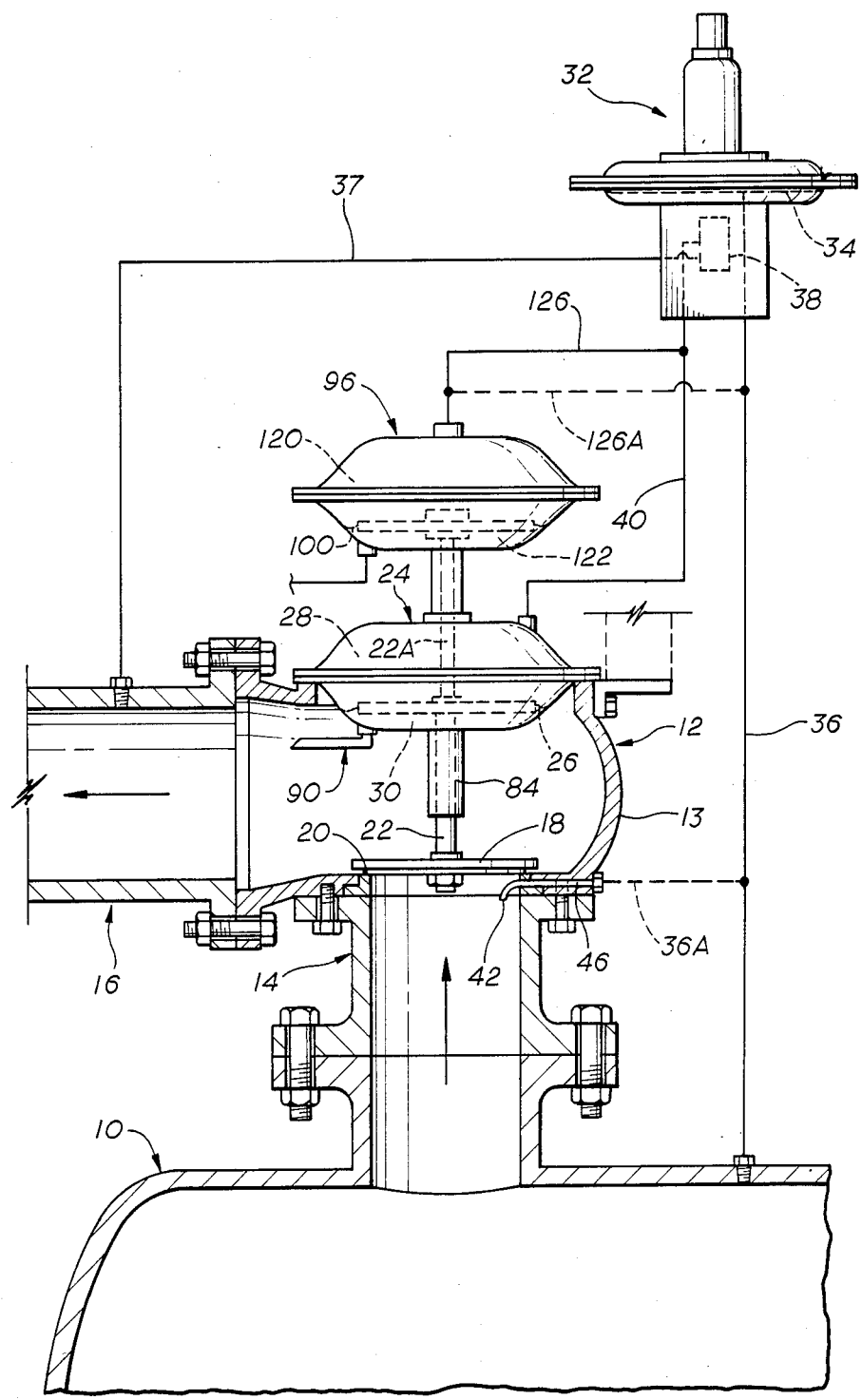
FIG. 1 is a schematic of a safety relief system for a control valve in the main flowline having a separate vacuum actuator therein for opening of the main valve member under negative pressure conditions.

Referring to the drawings for a better understanding of this invention, and more particularly to FIG. 1, a safety relief system for a control valve in a main flowline is illustrated schematically. A pressure vessel illustrated as a tank 10 has a main control valve indicated generally at 12 connected thereto. Control valve 12 has a body 13 and an inlet conduit 14 which forms an upstream conduit for the normal flow of fluid from tank 10 in the main flowline is connected to one side of body 13. An outlet conduit 16 forms a downstream conduit and is connected to another side of valve body 13. Control valve 12 has a main valve member 18 adapted for movement between open and closed positions relative to annular seat 20. A stem 22 having an upper end portion 22A extends from valve member 18.

The primary or main actuator indicated generally at 24 has a pressure responsive member therein comprising a diaphragm 26 separating actuator 24 into an upper fluid chamber or dome indicated generally at 28 on one side of diaphragm 26 and a lower fluid chamber generally indicated 30 on the other side of diaphragm 26. Diaphragm 26 is connected to valve stem 22 for movement with valve member 18.

A pilot valve is indicated generally at 32 and is preferably a no-flow pilot valve which is non-flowing during normal operation. Pilot valve 32 has a diaphragm 34 therein and a fluid line 36 extends from tank 10 to an inlet chamber (not shown) of pilot valve 32 adjacent diaphragm 34 for sensing the upstream fluid pressure. A fluid line 37 extends from an outlet chamber (not shown) of pilot valve 32 to the downstream conduit 16 for venting the fluid pressure downstream. An intermediate fluid chamber is provided between the inlet and outlet fluid chambers and a spool valve indicated generally at 38 is mounted within the intermediate fluid chamber to provide fluid communication selectively between the intermediate fluid chamber, and the inlet and outlet fluid chambers. The intermediate fluid chamber is in fluid communication with dome chamber 28 of actuator 24 through line 40. While various types of pilot valves may function effectively with the present safety relief fluid system, a pilot valve which has been found to function effectively is disclosed in pending application Ser. No. 774,809 filed Sept. 11, 1985, now U.S. Pat. No. 4,609,008 the entire disclosure of which is incorporated by this reference. For further details of pilot valve 32, reference is made to pending application Ser. No. 774,809.

While tank 10 has been shown as an example of a pressure vessel with which the control valve 12 and the related safety relief system may be utilized, it is to be understood that control valve 12 and the associated safety relief system may be employed with other types of pressure vessels or main flowlines and operate in substantially the same manner. Pilot valve 32 is shown schematically in FIG. 1 and may be mounted directly to valve body 13 by angle 41, if desired, as shown in FIG. 2.

In some instances it may be desirable to have inlet line 36 for control valve 32 in fluid communication with the upstream conduit at a position immediately adjacent the inlet side of valve member 18. For that purpose, the pitot tube 42 may be provided as shown in FIG. 2 having one end facing the direction of flow of the upstream fluid flow and having its opposite end in fluid communication with an annular chamber 44 connected by a port 46 in valve body 13 to line 36A in fluid communication with inlet line 36. In the event line 36 is in fluid communication with pitot tube 42, line 36 would not be connected to tank 10 and this may be desirable under certain conditions of usage. It is noted that pitot tube 42 reflects a negative pressure condition upon the backflow of fluid into tank 10 as fluid flowing past the extending end of pitot tube 42 creates a negative pressure condition.

Figure 2:
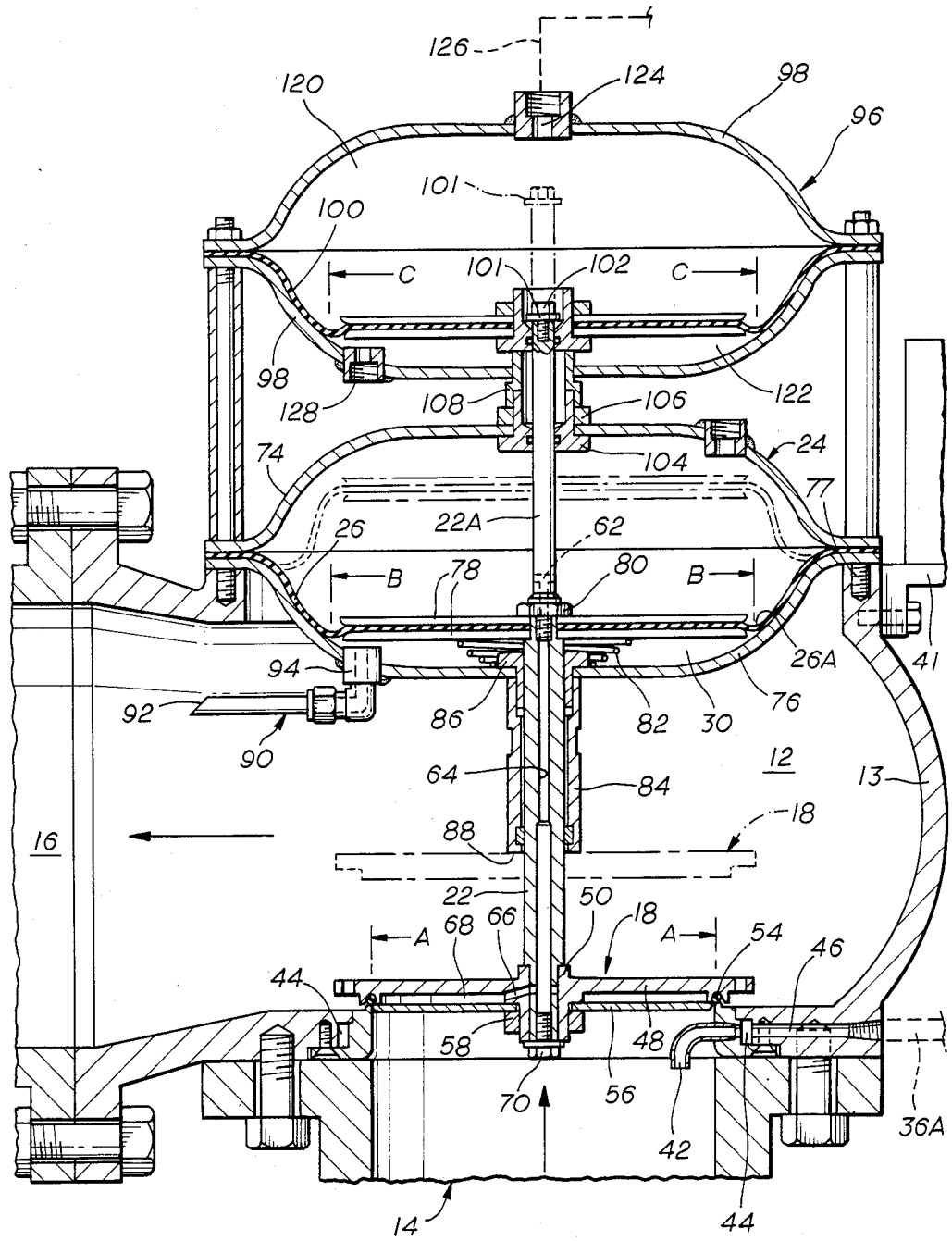
FIG. 2 is an enlarged sectional view of the main control valve shown in FIG. 1 having a main actuator for opening and closing the valve member under positive pressure conditions and a vacuum actuator in longitudinally spaced axial alignment with the main actuator, the broken line indication of the valve member and associated moving parts illustrating a maximum positive pressure condition.
Figure 4:
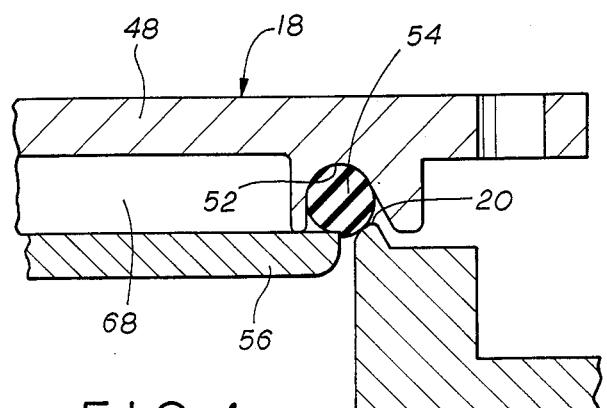
FIG. 4 is an enlarged sectional view of the sealing means between the annular seat and the valve member.

Referring to FIGS. 2 and 4, the sealing means for sealing between main valve member 18 and annular valve seat 20 is shown. Valve member 18 includes a valve plate member 48 having a central hub 50 receiving an end portion of stem 22. The outer peripheral portion of plate member 48 has an annular groove 52 formed therein receiving an O-ring 54. A lower retaining plate 56 is mounted about hub 50 and a threaded nut 58 is threaded onto an adjacent lower externally threaded end portion of stem 22 for clamping and retaining plate 56 and valve plate member 48 onto stem 22. O-ring 54 engages annular seat 20 in sealing relation when valve member 18 is in a closed position.

As shown in FIG. 2, upper shaft end portion 22A has a cross port 62 in fluid communication with an axial bore 64 of shaft 22. Axial bore 64 has a lower cross port 66 therein extending through hub 50 to an annular fluid chamber 68 formed between lower retaining plate 56 and valve plate member 48. A bolt 70 provides a plug for the end of bore 64. Cross port 66 is normally plugged when used with O-ring 54 to prevent fluid communication between O-ring 54 and chamber 28.

Figure 5:
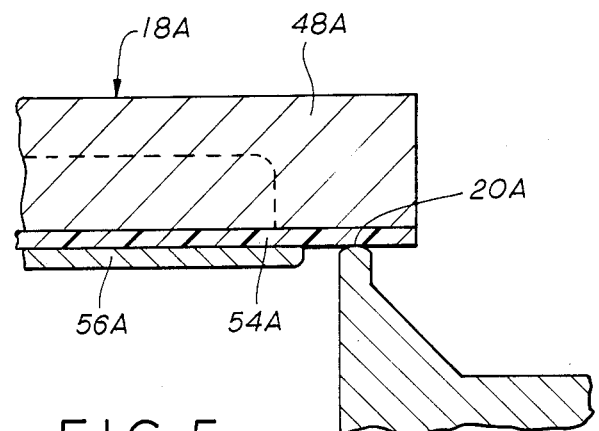
FIG. 5 is an enlarged sectional view of a modification of the sealing means between the main valve member and the annular seat comprising a soft elastomeric sealing member secured to the lower surface of the main valve.
Figure 6:
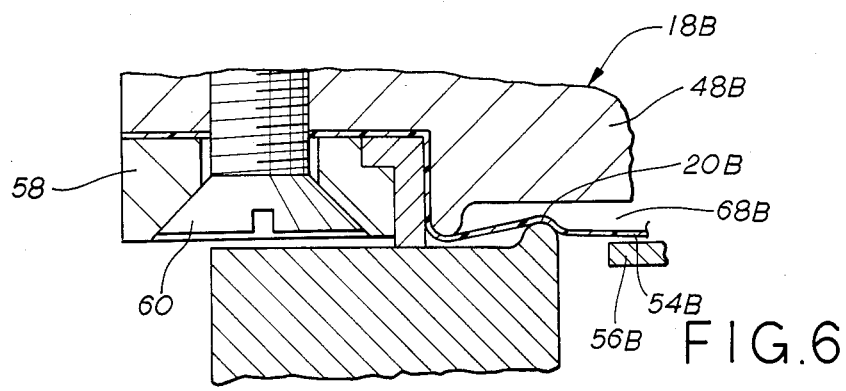
FIG. 6 is an enlarged sectional view of a further modification of the sealing means between the main valve member and the annular seat comprising a sealing membrane positioned between the annular seat and the main valve member.

Other types of sealing means may be provided for sealing valve member 18 against seat 20 and FIGS. 5 and 6 show other suitable sealing means. For example, FIG. 5 shows valve member 18A having a valve plate member 48A with a soft elastomeric sheet material generally indicated at 54A secured to the lower surface of valve plate member 48A. Retainer plate 56A retains the soft material 54A onto plate member 48A and the outer peripheral marginal portion of sheet material 54A seals against annular seat 20A thereby to provide a seal between valve member 18A and annular seat 20A.

FIG. 6 shows a further embodiment of sealing means in which a thin polytetrafluoroethylene (Teflon) membrane or film 54B extending from the hub of associated valve plate member 48B is mounted between valve plate member 48B of valve member 18B and annular seat 20B. Retainer plate 56B is arranged is one side of sealing membrane 44B and the outer peripheral marginal portion of membrane 54B is tightly clamped against valve plate member 48B by an annular flange 58 secured by a plurality of threaded screws 60. Membrane 54B is held or urged into sealing engagement with annular seat 20B by fluid pressure from the dome of the associated main actuator as illustrated in the embodiment of FIG. 2 for fluid chamber 68. For further details of sealing membrane 54B, reference is made to U.S. Pat. No. 3,722,852 dated Mar. 27, 1973, the entire disclosure of which is incorporated by this reference.

The main or primary actuator 24 comprises a pair of upper and lower body portions 74 and 76 having outer flanges clamping diaphragm 26 therebetween by bolts 77 secured to the upper end of valve body 13. Metal plates 78 on opposed sides of diaphragm 26 are tightly secured on shaft 22 by nut 80. Upper shaft end portion 22A is threaded into the main lower portion on shaft 22 adjacent nut 80.

A counter balance spring shown at 82 is mounted between body portion 76 and lower diaphragm plate 78 to counter balance the weight of valve member 18, shaft 22, and associated moving parts to aid in unseating or lifting valve member 18 upon pressure changes in fluid chambers 28 and 30.

Guide sleeve 84 has an upper internally threaded end portion which receives an externally threaded bushing 86 therein for tightly clamping of body portion 76 therebetween for mounting main actuator 24. The lower end of guide sleeve 84 forms a shoulder 88 which acts as a stop to limit the upper travel of valve member 18 to the fully open position as shown in broken lines in FIG. 2. It is noted that a relatively small unsupported portion 26A of diaphragm 26 is provided in the seated position of valve member 18 as shown in FIG. 2 as a relatively large portion of diaphragm 26 is supported against the adjacent surface of lower body portion 76.

Referring to FIG. 2, main actuator 24 has an eductor or pitot tube indicated generally at 90 having an open end 92 facing in the direction of downstream fluid flow and its other end 94 in fluid communication with lower fluid chamber 30 of actuator 24. Lower body portion 76 prevents diaphragm 26 from being exposed to a dynamic or flowing fluid pressure and therefore any fluttering or continual back and forth movement of diaphragm is minimized by the use of pitot tube 90 as a decreased rolling action of diaphragm 26 results. It is noted that chamber 30 may be exposed to a negative pressure from pitot tube 90 less than the pressure on the downstream side of control valve 12. Upon a backflow of fluid to tank 10 under negative pressure, a maximum total pressure is provided through pitot tube 90 to lower fluid chamber 30 of main actuator 24 and this maximizes the lifting force of diaphragm 26 to provide a maximum lift at minimal negative pressures. The positive fluid pressure in chamber 30 maximizes the lifting force on diaphragm 26 in the event of a backflow condition. Thus, the life of diaphragm 26 is prolonged by reducing fluttering action of diaphragm 26.

Diaphragm 26 is formed of a thin polytetrafluoroethylene material of around 0.010 to 0.020 in thickness and it is important that a small unsupported portion 26A of diaphragm 26 be provided in order to obtain minimal stress for a maximum static pressure of around 50 psi. As diaphragm 26 moves upwardly, the pressure in fluid chamber 28 is correspondingly reduced and may be around 18 psi at the maximum raised position as shown in the broken lines in FIG. 2 in which valve member 18 is in abutting condition with the stop 88 formed by guide sleeve 84.

In the event of a negative pressure in tank 10, for example, it is desirable for valve member 18 to be open so that a backflow of fluid pressure will increase the pressure in tank 10. Negative pressure in tank 10 is in fluid communication with pilot valve 32 and is reflected in fluid chamber or dome 28 of actuator 24 to effect an opening of valve member 18. However, the effective fluid pressure differential area under negative pressure for actuator 24 is the difference between the area shown in FIG. 2 at B for diaphragm 26 and the area shown at A for valve member 18. Thus, the effective fluid pressure differential area is relatively small and is around twenty-five (25) to thirty (30) percent of the total area shown at A for seat member 18. Therefore, under a vacuum condition, a relatively small lifting action is provided by diaphragm 26 for moving valve member 18 to an open position and in many instances, this effective area differential is not sufficient to meet the pertinent code requirements or specifications required for control valve 12. For this purpose, it is highly desirable to have an increased lifting action for opening valve member 18 when a negative pressure or vacuum condition occurs in tank 10, for example. It is required in many instances that the main valve member 18 open in order to permit a backflow of fluid into tank 10 under a very low negative pressure or vacuum while obtaining a high rate of flow. Also, a fast response is required for opening valve member 18 upon a sudden pressure drop in tank 10 to a vacuum or negative fluid pressure.

To provide for the opening of valve member 18 under a very low vacuum condition while providing a fluid backflow at a very high rate, a vacuum actuator generally indicated at 96 which forms an important part of this invention has been added. Vacuum actuator 96 is mounted in an axially aligned relation to main actuator 24 and in longitudinally spaced relation thereto. Vacuum actuator 96 may be added as a retrofit to existing pressure actuator 24 by the addition of end shaft portion 22A to shaft 22 and by suitable connections indicated generally at 97 to valve body 13 and primary actuator 24. Vacuum actuator 96 includes a body formed by upper and lower body portions 98 clamping a diaphragm 100 therebetween along the outer marginal edge portion of diaphragm 100. Shaft end portion 22A is threaded within the main portion or shaft 22 upon the addition of vacuum actuator 96 as shown and extends upwardly within vacuum actuator 96. The upper extending end of end shaft portion 22A has a stop washer 101 thereon secured by bolt 102 and forming an abutting surface.

A bushing 104 having a central bore therethrough extends from lower actuator 24 through body portion 74 and a lock nut 106 clamps bushing 104 onto body portion 74. A guide 108 extends upwardly from bushing 104 through a suitable opening in lower body portion 98 of vacuum actuator 96. A bushing 110 extends about the upper end of shaft end portion 22A and fits within a suitable opening in opposed diaphragm plates 112 which clamp diaphragm 100 therebetween. A nut 114 tightly clamps diaphragm plates 112 and diaphragm 100 against bushing 110. The upper end of bushing 110 has an enlarged central bore portion 116 therein defining a tapered shoulder 118 therein adapted to engage washer 101 in abutting relation under a vacuum condition. Diaphragm 100 separates vacuum actuator 96 into an upper fluid chamber 120 and a lower fluid chamber 122. The upper or vacuum chamber 120 is in fluid communication through port 124 and line 126 to the intermediate fluid chamber of pilot valve 32 as shown in FIG. 1. Thus, the same fluid pressure is communicated in vacuum chamber 120 of vacuum actuator 96 that is communicated to vacuum chamber 28 in the main actuator 24. In some instances, it may be desirable for line 126 to bypass pilot valve 32 and for that purpose, an alternate line 126A may extend directly to inlet line 36 for directly sensing inlet pressure at tank 10 or directly adjacent the upstream side of main valve member 18 through line 36A. In the event that line 126A is utilized, line 126 to pilot valve 32 would not be utilized.

It is pointed out as illustrated in broken lines in FIG. 2, that upon an opening of valve member 18 under a pressure condition, vacuum actuator 96 is inoperable and diaphragm 100 does not move with shaft 20 and shaft end portion 22A. Thus, minimal drag is exerted by vacuum actuator 96 on the movement of main valve member 18 under positive pressure conditions, and main actuator 24 is utilized exclusively in the movement of main valve member 18 under positive pressure conditions. Thus, the entire effective fluid pressure area of diaphragm 100 indicated at C in FIG. 2 is utilized exclusively for a vacuum condition thereby to provide a much higher lifting force for opening of main valve member 18 when a negative pressure is provided. Thus, an immediate response is provided to a vacuum condition in tank 10 thereby to permit a high backflow of fluid pressure to tank 10.

Figure 3:
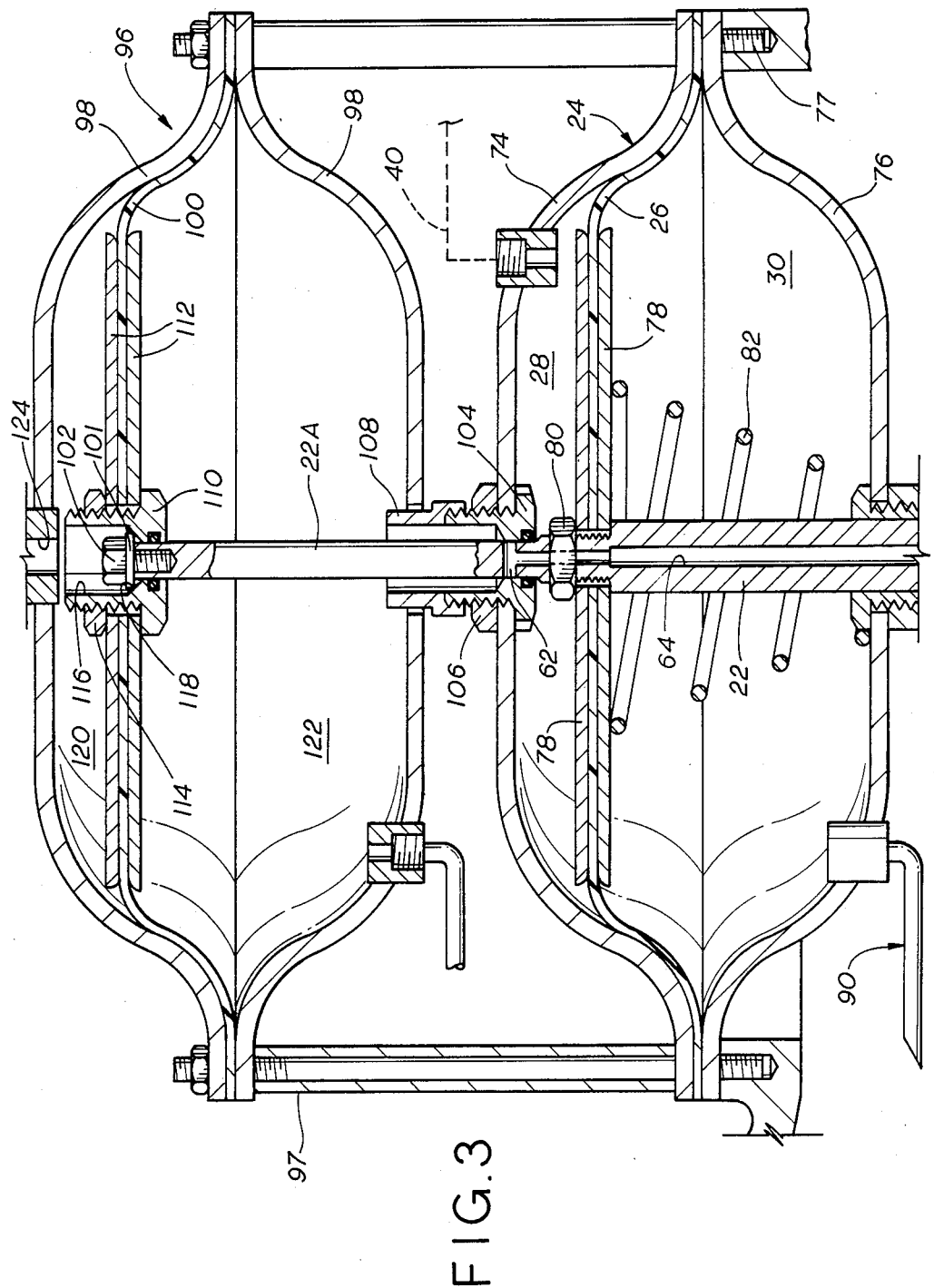
FIG. 3 is a longitudinal sectional view of the main actuator and an axially aligned vacuum actuator with the vacuum actuator being exposed to a negative fluid pressure and lifting the valve stem and associated valve member to the open position of the valve member for relief in the negative pressure condition resulting in a backflow of fluid to the pressure vessel.

Lower fluid chamber 122 is exposed to atmosphere through port 128. FIG. 3 illustrates the position of main actuator 28 and vacuum actuator 96 upon a vacuum or negative pressure condition in tank 10. Upward movement of diaphragm 100 results in shoulder 118 engaging the lower abutting surface of washer 101 to lift shaft 22. The lifting action is assisted by diaphragm 26 of actuator 24 and thus, valve member 18 is unseated to permit a backflow of fluid. In this condition, pitot tube 90 is exposed to a maximum total pressure and also assists in the lifting action as well as minimizing any fluttering action of diaphragm 26 in main actuator 24.

Referring now to FIGS. 7 and 8, a separate embodiment of a vacuum actuator is shown in which a light weight vacuum actuator 96A is provided which exerts a minimal drag and is especially adapted for providing a testing of vacuum actuator 96A under a positive pressure which simulates the negative pressure exerted in the upper fluid chamber 120A. Main actuator 24 is identical to main actuator 24 in the embodiment shown in FIGS. 1-4. The positive pressure is provided from a suitable source of fluid (not shown) through conduit 130 into lower fluid chamber 122A. An O-ring 132 seals fluid chamber 122A about quide 108A. Guide 108A has a lower plate 134 secured thereto which extends closely adjacent the inner surface of lower body portion 98A.

The entire lower surface of diaphragm 100A is exposed to fluid pressure in chamber 122A as no lower clamping plate is provided against the lower surface of diaphragm 100A. Lower plate 134 by being closely spaced from adjacent body portion 98A provides a minimum diaphragm gap or unsupported diaphragm portion between plate 134 and the portion of body portion 98A contacting diaphragm 100A in the lowermost position of diaphragm 100A. Diaphragm 100A is clamped between washers 135 adjacent bushing 110A and upper plate 112A by nut 114A. By eliminating a lower diaphragm plate, a lighter weight is provided for the movable portion of diaphragm 100A thereby to minimize the resistance to movement of diaphragm 100A.

It is noted that positive pressure from the upstream side of the control valve is provided in upper fluid chamber 120A and thus the upward movement of diaphragm 100A under positive pressure in lower chamber 122A acts against such positive pressure in chamber 120A. A suitable correction factor is provided to adjust for this condition in order to obtain an accurate simulation of a negative pressure condition. Similar testing may also be provided for the embodiment of FIGS. 1-4.

Referring to the portion of FIG. 8 shown in broken lines, a modification is shown in which vacuum actuator 96A and main actuator 24 are illustrated for use in a vent system for a pressure vessel operable under either a predetermined negative fluid pressure or a predetermined positive fluid pressure in the associated pressure vessel, such as a tank. A hood 140 extends outwardly from main actuator 24 and is mounted thereon. A vent valve member 142 has an outer side thereof exposed to atmosphere and secured to the valve stem which extends within actuators 24 and 96A as shown. The inner side of vent valve member 142 seats on an annular seat 144 on the upper end of an annular seat member 145 and is in fluid communication with the pressure vessel. Annular seat member 145 is secured to the upper end of a vent conduit 146 extending to the pressure vessel. Removable or detachable support rods 147 mount actuators 24 and 96A on the upper end of seat member 145 and vent conduit 146. Actuators 24 and 96A and the associated pilot valve 32 function in the same manner described above for use with a main control valve 12 across main flowline but are operable to open vent valve member 142 under either a predetermined negative pressure or a predetermined positive pressure for venting an associated pressure vessel to atmosphere.

The term "control valve" as used in the specification and claims herein shall not be interpreted as including, but not limited to, a valve which opens to atmosphere upon the reaching of a predetermined negative or positive fluid pressure on the upstream side of the valve. The term "flowline" or "main flowline" shall be interpreted as including, but not limited to, a direct atmospheric discharge from the downstream side of the valve.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. In a safety relief system for a tank having a main flowline connected to the tank and a control valve in the main flowline adapted to open under a predetermined negative fluid pressure within the tank to permit a flow of fluid to the tank and to open under a predetermined positive fluid pressure within the tank to permit a flow of fluid from the tank, the control valve having a valve member in the flowline movable between open and closed positions and a longitudinally extending valve stem secured to said valve member for movement therewith;

improved means for actuating said control valve under both negative and positive fluid pressures within said tank comprising axially aligned first and second diaphragm actuators receiving said stem and in axial alignment with said valve member and stem;

said first diaphragm actuator including a body and a diaphragm within the body connected to said valve stem for defining a fluid chamber therein on the outer side of said diaphragm opposite said valve member, means in fluid communication with said fluid chamber and responsive to upstream fluid pressures in said main flowline for effecting movement of said diaphragm and associated movement of said valve member between open and closed positions in response to changes in said upstream and downstream fluid pressures; and said second diaphragm actuator connected to said valve stem outwardly of said first diaphragm actuator including a body and a second diaphragm within the body defining a vacuum fluid chamber therein on the outer side of said second diaphragm, said stem being connected to said second diaphragm for longitudinal movement relative to said second diaphragm in one direction of travel and for longitudinal movement with said second diaphragm in an opposite direction of travel, means in fluid communication with said vacuum fluid chamber on said outer side of said second diaphragm and responsive to a negative fluid pressure in said main flowline for effecting movement of said second diaphragm in said opposite direction of travel, said second diaphragm being operatively connected to said stem for moving said stem therewith for opening of said valve member under said negative fluid pressure.

2. In a safety relief system as set forth in claim 1 wherein said valve member is a plate member mounted on an annular valve seat for modulating movement between open and closed positions.

3. In a safety relief system as set forth in claim 2 wherein an O-ring is mounted between said valve member and said annular seat for sealing therebetween.

4. In a safety relief valve as set forth in claim 2 wherein a thin sealing membrane is mounted between said valve member and said annular valve seat; and a fluid passage is provided in said stem and valve member between said fluid chamber of said first diaphragm actuator and said sealing membrane to provide fluid pressure against said sealing membrane for urging said membrane into sealing engagement with said annular valve seat.

5. In a safety relief valve as set forth in claim 2 wherein a soft generally flat seal is secured to said plate member and engages said annular valve seat in sealing relation.

6. In a safety relief system for a control valve in a main flowline including a valve member mounted in the main flowline for movement between open and closed positions, a stem connected to one side of said valve member and extending therefrom outwardly of said control valve, a main actuator for the valve member having a fluid pressure chamber and a fluid pressure responsive member in the fluid pressure chamber connected to said stem of the valve member to control the movement of the valve member primarily under a positive pressure condition, and a pilot valve in fluid communication with said fluid pressure chamber and with the upstream side of said flowline for controlling the fluid pressure to said fluid pressure chamber; an improved vacuum actuator mounted outwardly of and in spaced axial alignment with said main actuator, said improved vacuum actuator operable only in response to a negative pressure in said flowline and comprising:

a body having an outer vacuum fluid chamber therein, a diaphragm in said vacuum fluid chamber connected to said stem for operatively connecting the diaphragm with said valve member for movement of the valve member to an open position upon the reaching of a predetermined negative pressure in said vacuum fluid chamber, and a fluid passage from said vacuum fluid chamber to said flowline for sensing a negative pressure in said flowline for opening of said valve member.

7. In a safety relief system as set forth in claim 6 wherein said fluid passage from said fluid chamber in said vacuum actuator to said flowline is through said pilot valve.

8. In a safety relief system as set forth in claim 6 wherein said fluid passage from said fluid chamber in said vacuum actuator to said flowline bypasses said pilot valve.

9. In a safety relief system as set forth in claim 6 wherein said control valve has an upstream inlet on one side of the valve member and a downstream outlet on the other side of the valve member, and a tank is connected to said upstream inlet.

10. An improved vacuum relief actuator adapted to be positioned in axial alignment with and longitudinally spaced from a main actuator for a control valve in a main flowline having a main valve member therein, the vacuum relief actuator and main valve actuator having enclosed bodies axially spaced from each other, and a valve stem connected to one side of the main valve member and extending therefrom through said enclosed main actuator body and within said enclosed vacuum relief actuator body for movement of the main valve member between open and closed positions; said improved vacuum relief actuator, further comprising:

a flexible diaphragm in said enclosed body forming an upper fluid vacuum chamber on one side of the diaphragm and a lower fluid chamber on the other side of the diaphragm;

means in said enclosed body providing fluid communication of said lower fluid chamber to atmosphere; and means in fluid communication with said vacuum chamber for sensing a negative pressure from the upstream side of the flowline, said valve stem being connected to said diaphrgam for movement with said diaphragm upon a negative pressure condition within said vacuum chamber and the upstream side of the flowline, and for movement relative to said diaphragm upon a positive pressure condition on the upstream side of said flowline.

11. An improved vacuum relief actuator as set forth in claim 10 wherein said valve stem has a removable end portion extending from said main actuator and received within said vacuum actuator for connection to said diaphragm.

12. An improved vacuum relief actuator as set forth in claim 10 wherein a bushing is secured to said diaphragm and has a central bore receiving the valve stem, said valve stem having an abutment on its extending end engaging sad bushing upon movement of said diaphragm under a negative pressure in said vacuum chamber for opening of the control valve, and being spaced from said abutment for normal operation of said control valve under a positive pressure in the upstream side of said flowline.

13. An improved vacuum relief actuator as set forth in claim 10 wherein said lower fluid chamber is adapted to receive a positive fluid pressure for simulating a negative fluid pressure in said vacuum chamber thereby to permit testing of said vacuum relief actuator.

14. In a safety relief system, a control valve including a valve member mounted in a main flowline for movement between open and closed positions, a valve stem connected to the valve member and extending therefrom, a main actuator receiving the valve stem and having a fluid pressure chamber with a fluid pressure responsive member therein connected to the valve stem to control the movement of the valve member under a positive pressure upstream of the control valve, a pilot valve in fluid communication with said fluid pressure chamber and with said flowline for controlling the fluid pressure to said fluid pressure chamber;

an improved vacuum actuator mounted outwardly of and in spaced axial alignment with said main actuator, said improved vacuum actuator operable in response to a negative pressure in said flowline and comprising:

a body receiving said valve stem and having an outer vacuum fluid chamber therein, a diaphragm in said fluid chamber connected to said valve stem for movement of the valve member to an open position upon the reaching of a predetermined negative pressure in said vacuum fluid chamber, and a fluid pressure from said fluid chamber in said vacuum actuator to said flowline for sensing a negative pressure in said flowline for opening of said valve member; and means mounting said stem for longitudinal movement relative to said vacuum actuator diaphragm under a positive pressure upstream of said control valve, and for movement with said vacuum actuator diaphragm under a negative pressure upstream of said control valve.

15. In a vent system for venting a pressure vessel to atmosphere under either a predetermined positive pressure or a predetermined negative pressure within the pressure vessel;

a fluid conduit in fluid communication with said pressure vessel;

a vent valve member normally blocking fluid flow from said fluid conduit within a predetermined fluid pressure range within said pressure vessel and mounted for movement to an open position upon the reaching of either a predetermined positive pressure or a predetermined negative pressure within said pressure vessel;

a valve stem connected to said vent valve member for movement therewith;

a main actuator means coaxially spaced from said vent valve member, and operatively connected to said valve stem for opening of the vent valve member under a predetermined positive pressure; and a vacuum diaphragm actuator in axial alignment with said main actuator means and operatively connected to said valve stem outwardly of said main actuator means and having a vacuum chamber therein, means in fluid communication with said vacuum chamber for sensing a negative fluid pressure in said pressure vessel, said vacuum actuator operable for movement with the valve stem and vent valve member to an open position only when a predetermined negative fluid pressure is reached in said pressure vessel, said valve stem moving relative to said vacuum diaphragm actuator under a predetermined positive pressure in said pressure vessel.

16. In a vent system for venting a pressure vessel as set forth in claim 15 wherein said vacuum diaphragm actuator has a body and a flexible diaphragm within said body defining a vacuum chamber, and said valve stem extends within said body and is operatively connected to said diaphragm, said valve stem moving relative to said diaphragm upon a predetermined positive pressure within the pressure vessel and moving with said diaphragm upon a predetermined negative pressure within said pressure vessel.

17. Actuator means for opening a vent valve for a pressure vessel under either a negative fluid pressure or a positive fluid pressure within the pressure vessel;
 a vent valve member having an inner side thereof in fluid communication with said pressure vessel and the other side therein in fluid communication with atmosphere, said vent valve member blocking fluid flow from said pressure vessel to atmosphere under a predetermined fluid pressure range within the pressure vessel;
 a stem connected to said other side of said vent valve and extending therefrom;
 main actuator means coaxially spaced from said vent valve member, and operatively connected to said valve stem for opening of the vent valve member under a predetermined positive pressure;
 a vacuum diaphragm actuator in axially aligned spaced relation to said main actuator means and operatively connected to said valve stem outwardly of said main actuator means and said vent valve member and having a vacuum chamber therein, means in fluid communication with said vacuum chamber for sensing a negative pressure in said pressure vessel, said vacuum actuator operable for movement with the valve stem and vent valve member to an open position when a predetermined negative fluid pressure is reached in said pressure vessel; and
 a lost motion connection between the stem and said vacuum diaphragm actuator to permit movement of said stem relative to the vacuum diaphragm actuator under a positive fluid pressure in said pressure vessel.

18. Actuator means for opening a vent valve as set forth in claim 17 wherein means mount said stem for longitudinal movement relative to said vacuum actuator diaphragm under a positive pressure within the pressure vessel, and for movement with said vacuum actuator diaphragm under a negative pressure within the pressure vessel.

19. In a safety relief vent system for a pressure vessel, vent valve means including a vent valve member having an inner side thereof in fluid communication with said pressure vessel and the other side thereof in fluid communication with atmosphere, said vent valve member having a valve stem extending therefrom and blocking fluid flow from said pressure vessel to atmosphere within a predetermined pressure range;
 a main actuator coaxially spaced from said vent valve member, receiving the valve stem and having a fluid pressure chamber with a fluid pressure responsive member therein connected to the valve stem for opening of the vent valve member under a predetermined positive pressure within the vessel;
 a pilot valve in fluid communication with said fluid pressure chamber for controlling the fluid pressure to said fluid pressure chamber;
 a vacuum actuator mounted outwardly of and in spaced axial alignment with said main actuator, said vacuum actuator operable in response to a predetermined negative pressure in said vessel and having a body with a fluid chamber therein receiving said valve stem, a diaphragm in said fluid chamber connected to said valve stem for movement of the vent valve member to an open position upon the reaching of a predetermined negative pressure in said vessel, and a fluid passage from said fluid chamber in said vacuum actuator to said vessel for sensing a negative pressure in said vessel for opening of said vent valve member under a predetermined negative pressure in said vessel.

20. In a safety relief vent system as set forth in claim 19 wherein means mount said stem for longitudinal movement relative to said vacuum actuator diaphragm under a predetermined positive pressure in said vessel, and for movement with said vacuum actuator diaphragm under a predetermined negative pressure in said vessel.

21. In vacuum relief means for a control valve in a main flowline having a main actuator including a body receiving a valve stem connected to the control valve for movement of the control valve between open and closed positions under a positive pressure in the main flowline, and a main diaphragm within the main actuator body defining an upper fluid chamber on one side of the main diaphragm and a lower fluid chamber on the other side of the main diaphragm; the improvement of:
 a vacuum diaphragm actuator having a body in axial alignment with and longitudinally spaced from said main actuator body, a flexible vacuum diaphragm within said vacuum actuator body defining a vacuum chamber, said valve stem extending within said vacuum actuator body and connected to said vacuum diaphragm, means in fluid communication with said vacuum chamber for sensing fluid pressure upstream of said control valve, said valve stem moving relative to said vacuum diaphragm upon a positive pressure being exerted upsteam of said control valve and moving with said vacuum diaphragm upon a negative pressure being exerted upstream of said control valve; and
 a pitot tube extending between and providing fluid communication between said lower fluid chamber of the main actuator and downstream of said main flowline to provide a total fluid pressure in said lower fluid chamber upon a backflow of fluid through said control valve upon a negative pressure exerted upstream of the control valve thereby to assist the main diaphragm in opening of the control valve upon the exertion of such negative pressure.

22. An improved vacuum relief actuator adapted to be positioned in axial alignment with and longitudinally spaced from a main actuator for a control valve in a main flowline having a main valve member and a valve stem connected thereto for movement of the main valve member between open and closed positions; said improved vacuum relief actuator comprising:

a body having a flexible diaphragm therein forming an upper fluid vacuum chamber on one side of the diaphragm and a lower fluid chamber on the other side of the diaphragm, means in fluid communication with said vacuum chamber for sensing fluid pressure on the upstream side of said flowline, said valve stem being connected to said diaphragm for movement with said diaphragm upon a negative pressure condition within said vacuum chamber and the upstream side of the flowline, and for movement relative to said diaphragm upon a positive pressure condition on the upstream side of said flowline, said valve stem having a removable end porton extending from said main actuator and received within said vacuum actuator for connection to said diaphragm;

said lower fluid chamber being adapted to receive a positive fluid pressure for simulating a negative fluid pressure in said vacuum chamber thereby to permit testing of said vacuum relief actuator, said body having a lower body portion and a guide within said lower body portion receiving said valve stem therein, the upper end of said guide having a lower diaphragm support plate fixed thereto and supporting the diaphragm thereon under a positive pressure condition upstream of said flowline, said diaphragm moving relative to said lower diaphragm plate upon a negative pressure condition upstream of said flowline and lifting said stem for opening of the control valve.

23. In a safety relief system for a tank having a main flowline connected to the tank and a control valve in the main flowline adapted to open under a predetermined negative fluid pressure within the tank to permit a flow of fluid to the tank and to open under a predetermined positive fluid pressure within the tank to permit a flow of fluid from the tank, the control valve having a valve member in the flowline movable between open and closed positions and a longitudinally extending valve stem connected to said valve member for movement therewith;

improved means for actuating said control valve under both negative and positive fluid pressures within said tank comprising a pair of axially aligned actuators receiving said stem and positioned in spaced axial alignment with said valve member and stem, said actuators each having a fluid pressure responsive member therein connected to said stem;

one of said actuators having negative and positive fluid chambers on opposed sides of said pressure responsive member, means providing fluid communication between said main flowline and said fluid chambers, said one actuator responsive to both upstream and downstream fluid pressures in said main flowline for moving said stem and associted valve member betwen open and closed positions in response to changes in said upstream and downstream fluid pressures;

the other actuator having a negative fluid chamber on one side of its fluid pressure responsive member, means in fluid communication with said negative fluid chamber for sensing a negative pressure from the upstream side of said main flowline, said other actuator moving said stem and associated valve member to an open position upon a predetermined negative pressure being exerted in the upstream side of said main flowline; and a lost motion connected between the pressure responsive member in said other actuator and the stem to permit movement of the stem and associated valve member relative to said pressure responsive member in said other actuator upon the exertion of a positive pressure on the upstream side of said main flowline, said other actuator being inoperable upon the exertion of a positive pressure on the upstream side of said main flowline and being operable in combination with said one actuator under a negative pressure on the upstream side of said main flowline for opening said valve member in a minimum of time upon the exertion of such a negative pressure.

24. In a safety relief system as set forth in claim 23 wherein the downstream side of said main flowline is in fluid communication with atmosphere.

25. In a safety relief system as set forth in claim 23 wherein the pressure responsive members of said actuators comprise flexible diaphragms.

26. In a safety relief system for actuating a vent valve adjacent a pressure vessel under either a negative fluid pressure or a positive fluid pressure within the pressure vessel, the vent valve having an inner side thereof in fluid communication with said pressure vessel and the other side therein in fluid communication with atmosphere, said vent valve having a longitudinally extending stem connected thereto and blocking fluid flow from said pressure vessel to atmosphere under a predetermined fluid pressure range within the pressure vessel;

improved means for actuating said vent valve comprising a pair of axially aligned actuators receiving said stem and positioned in axial alignment with said vent valve and stem, said actuators each having a fluid pressure responsive member therein connected to said stem;

one of said actuators having negative and positive fluid chambers on opposed sides of said pressure responsive member, means in fluid communication with said fluid chambers for sensing fluid pressure in said pressure vessel, said one actuator having means responsive to both negative and positive fluid pressures in said pressure vessel for moving said stem and associated vent valve between open and closed positions in response to changes in said negative and positive fluid pressures;

the other actuator having a negative fluid chamber on one side of its fluid pressure responsive member, means in fluid communication with said negative fluid chamber for sensing a negative pressure from the upstream side of said pressure vessel, said other actuator moving said stem and associated vent valve to an open position upon a predetermined negative pressure in said pressure vessel; and a lost motion connection between the pressure responsive member in said other actuator and the stem to permit movement of the stem and associated valve member relative to said pressure responsive member in said other actuator upon the exertion of a positive pressure from the pressure vessel, said other actuator being inoperable upon the exertion of a positive pressure from the pressure vessel and being inoperable in combination with said one actuator under a negative pressure from the pressure vessel for opening said vent valve in a minimum of time upon the exertion of such a negative pressure.

* * * * *